May 17, 1927.
H. C. YOUNG ET AL
1,628,869
MASTICATING OF RUBBER AND APPARATUS THEREFOR
Filed July 12, 1926
2 Sheets-Sheet 1
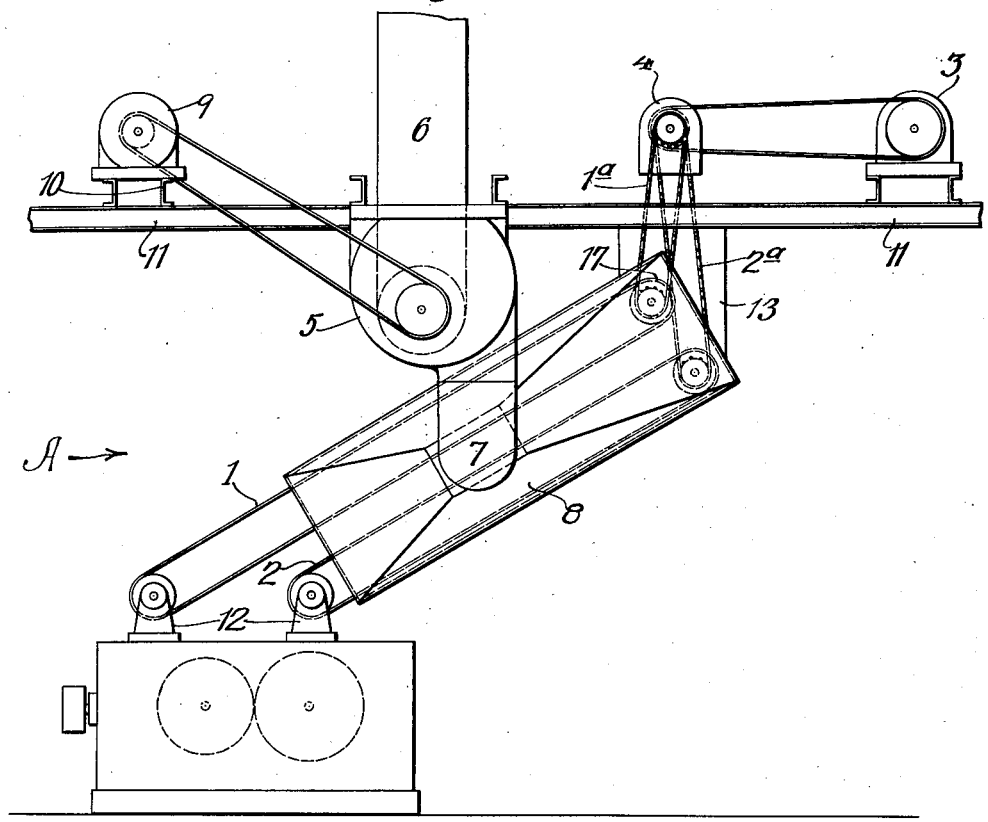
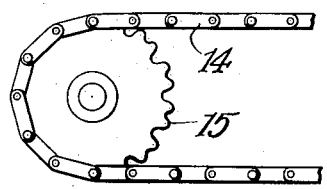
Inventors
HARRY CLARANCE YOUNG
HENRY OWEN BURR.
By Their Attorney May 17, 1927.

H. C. YOUNG ET AL 1,628,869

MASTICATING OF RUBBER AND APPARATUS THEREFOR

Filed July 12, 1926 2 Sheets-Sheet 2

Inventors
HARRY CLARENCE YOUNG.
HENRY OWEN BURR.
By their Attorney

Patented May 17, 1927.

1,628,869

UNITED STATES PATENT OFFICE.

HARRY CLARANCE YOUNG, OF SUTTON, AND HENRY OWEN BURR, OF WALNEY, ENGLAND, ASSIGNORS TO DUNLOP TIRE AND RUBBER CORPORATION OF AMERICA, A CORPORATION OF NEW YORK.

MASTICATING OF RUBBER AND APPARATUS THEREFOR.

Application filed July 12, 1926, Serial No. 121,978, and in Great Britain May 1, 1925.

This invention relates to the masticating of raw rubber and comprises improved apparatus whereby the rubber which passes through or between the rollers of a masticating or mixing mill is conveyed to and from such rollers and during such conveyance is cooled by a current of air.

Raw rubber for use in manufacture is first washed and shredded or cut by mechanical means and is then passed between rollers in a masticating mill to render it soft and pliable. To obtain good results it is essential that the rubber should pass through the masticating mill a number of times and that it is cooled between each successive operation. In some cases it has been necessary to remove the rubber from the mill and allow it to cool several times before it is completely masticated and in other cases it has been conveyed to and from the masticating mill on a series of conveyors which bring it in contact with one or more water cooled drums or hollow rolls during its passage.

The objects of our invention are to dispense with water for such cooling purposes and to provide an improved method of cooling the rubber between each passage through the masticating mill and to provide simplified apparatus by which such improved method may be carried into practice.

According to this invention the rubber is passed between the rollers of an ordinary masticating mill and then to a suitable conveyor to and from the said rollers upon which conveyor it is cooled by means of a current of cold air forced or induced by a suitable fan conveniently arranged adjacent to the conveyor.

The invention will be clearly understood from the following description when read in connection with the accompanying drawings wherein:—

Fig. 1 is an end elevation of one embodiment of our invention.

Figs. 3 and 4 are detail views of a conveyor for use in connection with our invention.

Figure 2:
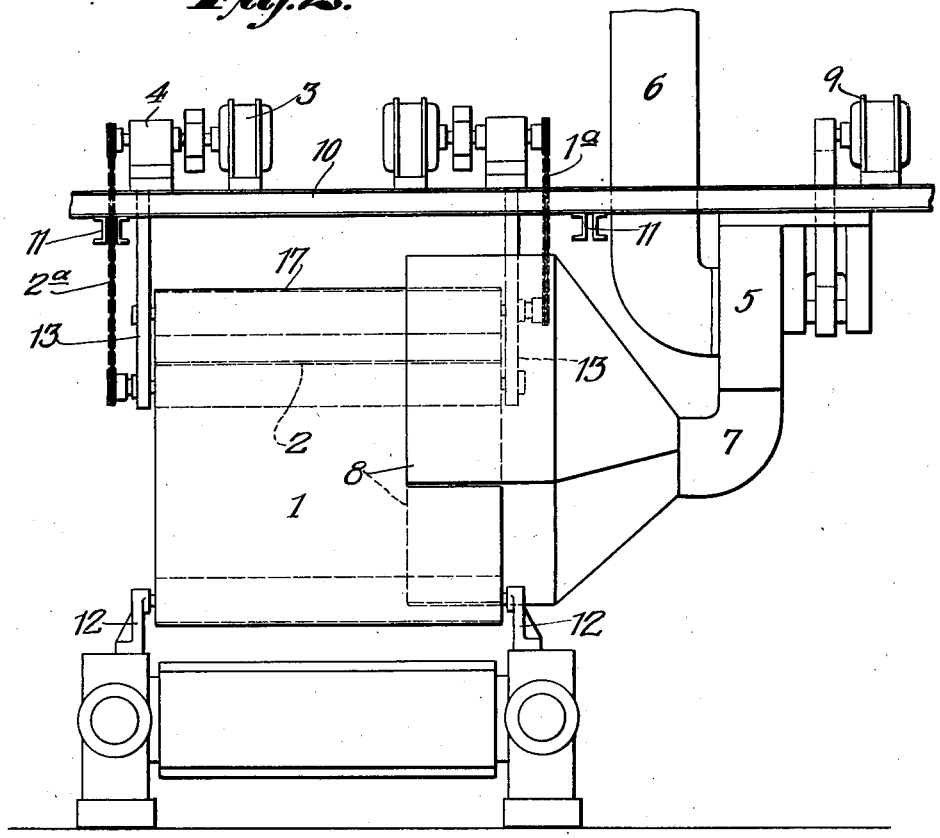
Fig. 2 is a front view of Fig. 1 in the direction of arrow A.

In the embodiment illustrated the circulating means consist of two endless conveyors 1 and 2 actuated individually by driving chains 1ª and 2ª respectively in association with a suitable motor 3 and reduction gear 4. Conveniently arranged adjacent to the conveyors is a fan 5 whereby a current of cool air is forced across the rubber travelling to and from the mill. The fan is supplied with outside air through an inlet pipe 6 and the outlet of the fan is connected through a suitably angled pipe 7 to a hood 8 whereby the air is distributed over a considerable surface of the travelling rubber. The fan as shown is actuated by a separate motor 9. The fan motor, the fan, the conveyor and its associated reduction gear are supported by suitable girders, as for instance 10, spanning the roof members 11. The conveyors are mounted between supports 12 and 13 upon the framework of the mill and pendant from the girders which support the reduction gear respectively.

As shown in Figs. 1 and 2 the conveyors are endless bands or belts. In this construction, however, one side of the rubber sheet is screened from the cooling draught by reason of its contact with the belt.

We, therefore, provide an improved construction of conveyor adapted to expose the maximum possible surface of the rubber to the cooling action of the air.

Figure 4:
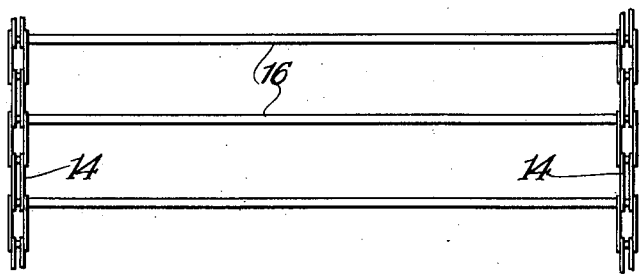

Referring to Figs. 3 and 4 each conveyor comprises a pair of chains of known type 14 adapted to pass around suitable sprockets 15 mounted upon the supports 12 and 13. The said chains are spanned at intervals by rods or the like 16 which support the sheet rubber and screen only the least possible surface thereof from the cooling current of air.

In operation the raw rubber is placed between the rollers of the mill and masticated until it adheres to the front roll thereof in sheet like formation. The rubber sheet is then slit along the length of the said roll and the severed end conveyed by hand into the path of the upper belt. It is then continuously drawn thereon by the travel of such belt and so conveyed to the extremity 17 thereof whence it falls into the path of the belt 2 whereby it is conveyed back to the rolls of the masticating mill having been efficiently cooled in its passage by means of the air blast hereinbefore referred to.

Though we have described quite precisely the arrangement of apparatus illustrated it is not to be construed that we are limited thereto. Various modifications in both the apparatus and method may be made without departing from the invention defined in the appended claims.

What we claim is:—

1. In combination with the rolls of a rubber masticating mill, a conveyor comprising a series of spaced rods joined at their ends to connecting links, and a fan adjacent said conveyor for distributing a current of air over the rubber carried on said conveyor.

2. Apparatus for masticating rubber comprising a masticating mill, endless conveyors arranged above the said mill, a fan adjacent the said conveyors and a hood connected with said fan and embracing a portion of said conveyors so as to distribute the air current over the material on said conveyors.

3. The method of masticating rubber which includes passing it to and from the rolls of a masticating mill to reduce the mass to sheet-like formation, stripping the sheet-like mass from the rolls of the mill and supporting it at spaced intervals and passing it through a current of air.

4. The method of masticating rubber which includes passing it to and from the rolls of a masticating mill and between passes supporting it at spaced intervals and subjecting both sides of the sheet-like mass to the cooling action of a current of air under pressure.

And in witness whereof, I have hereunto signed my name.

HENRY OWEN BURR.

In witness whereof, I have hereunto signed my name.

H. C. YOUNG.